(12) United States Patent
Lin et al.

(10) Patent No.: US 7,382,326 B1
(45) Date of Patent: Jun. 3, 2008

(54) MULTI-BAND ANTENNA

(75) Inventors: Ching-Chi Lin, Taipei Hsien (TW);
Kai Shih, Taipei Hsien (TW); Yu-Yuan Wu, Taipei Hsien (TW)

(73) Assignee: Cheng Uei Precision Industry, Taipei Hsien (TW)

( * ) Notice: Subject to any disclaimer, the term of this patent is extended or adjusted under 35 U.S.C. 154(b) by 19 days.

(21) Appl. No.: 11/613,260

(22) Filed: Dec. 20, 2006

(51) Int. Cl.
*H01Q 1/24* (2006.01)
*H01Q 1/38* (2006.01)

(52) U.S. Cl. .............................. 343/702; 343/700 MS

(58) Field of Classification Search ................ 343/702, 343/700 MS
See application file for complete search history.

(56) References Cited

U.S. PATENT DOCUMENTS

2006/0176233 A1* 8/2006 Tang et al. ................. 343/850
2007/0109199 A1* 5/2007 Hung et al. ........... 343/700 MS
2007/0120753 A1* 5/2007 Hung et al. .................. 343/702
2007/0194993 A1* 8/2007 Deavours et al. ..... 343/700 MS

* cited by examiner

*Primary Examiner*—Hoang V Nguyen
(74) *Attorney, Agent, or Firm*—WPAT, P.C.; Anthony King

(57) ABSTRACT

A multi-band antenna configured in a portable electrical device capable of operating in a low frequency bandwidth and a high frequency bandwidth has an elongated radiating body and a feeding conductor connecting the elongated radiating body. The feeding conductor has opposite side arms respectively connecting the elongated radiating body and a connecting portion connecting the side arms. A feeding point is arranged at a corner where one of the side arms connects to the connecting portion. The elongated radiating body and the feeding conductor are located on different planes of the portable electronic device. According to the position where the feeding conductor connects to the elongated radiating body and the position where the feeding point is arranged at, the multi-band antenna has a preferred low frequency bandwidth and a preferred high frequency bandwidth. Therefore, the portable electrical device can operate at different wireless bandwidths.

12 Claims, 2 Drawing Sheets

MULTI-BAND ANTENNA

BACKGROUND OF THE INVENTION

1. Field of the Invention

The invention relates to a multi-band antenna, and particularly to a multi-band antenna which is adapted for configuring in portable electrical devices.

2. The Related Art

There is a growing requirement for multi-band antennas used in wireless communication devices to adapt multi-band operation of wireless communication devices. It is necessary that an antenna adapting to being configured in wireless communication devices is capable of operating in various wireless communication bands such as GSM850 (Global System for Mobile communications), EGSM (Extended Global System for Mobile communications), DCS1800 (Digital Cellular System), PCS1900 (Personal Conferencing Specification), W-CDMA2100 (Wideband Code Division Multiple Access), Wi-Fi (Wireless Fidelity), etc.

SUMMARY OF THE INVENTION

An object of the present invention is to provide a multi-band antenna operating in various wireless communication bands.

According to the invention, the multi-band antenna includes an antenna body defining opposite ends and a feeding conductor connecting to the antenna body. The antenna body has a first radiating branch defining opposite elongated edges, a second radiating branch extending from one end of the first radiating branch and a third radiating branch extending from the other end of the first radiating branch. Wherein the length of the first radiating branch is larger than the length of the second radiating branch and the length of the first radiating branch is also larger than the length of the third radiating branch.

The feeding conductor is curved to U-shape having a feeding point. The feeding conductor has opposite side arms and a connecting portion. One end of each side arm respectively connects to the second radiating branch and the other end of each side arm respectively connects both ends of the connecting portion. An outer edge of one of the side arms is at the same level with an area where the first radiating branch connects to the second radiating branch. The feeding point is arranged at a corner of the feeding conductor near the outer edge connecting the first radiating branch.

While the multi-band antenna operates at wireless communication, the multi-band antenna has a low frequency bandwidth and a high frequency harmonic bandwidth. According to the position where the feeding conductor connects to the antenna body, and the position where the feeding point is arranged at the corner of the feeding conductor, the multi-band antenna has a preferred range of the low frequency bandwidth and the high frequency harmonic bandwidth. Therefore, the low frequency bandwidth of the multi-band antenna includes GSM850 and EGSM bands and the high frequency harmonic bandwidth of the multi-band antenna includes DCP1800, PCS1900, W-CDMA2100 and Wi-Fi bands.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
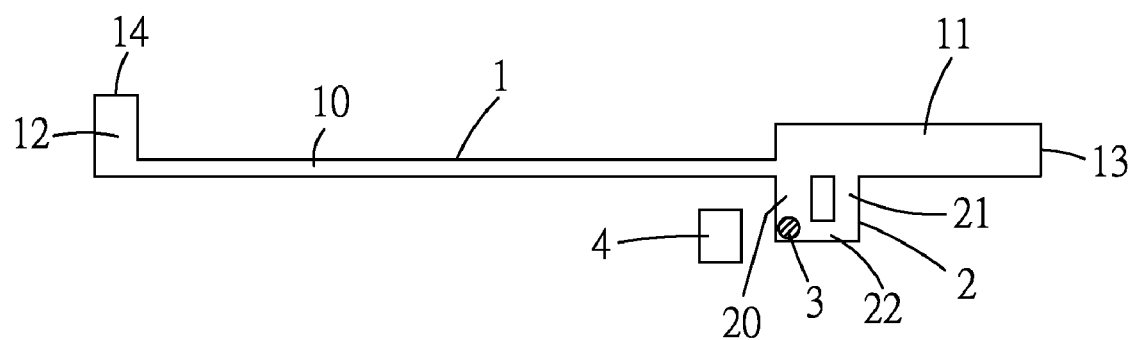
FIG. 1 shows the structure of a preferred embodiment of a multi-band antenna according to the present invention.

Please refer to FIG. 1, which shows the structure of a preferred embodiment of a multi-band antenna 100 according to the present invention. The multi-band antenna 100 is made of metallic substances for example, making from a metal foil, printing on a printed circuit board and etc, having an antenna body 1 and a feeding conductor 2.

The antenna body 1 defining a first end 13 and a second end 14 includes a first radiating branch 10 defining opposite elongated edges. A second radiating branch 11 having the first end 13 extends from one end of the first radiating branch 10. In this case, the width of the first radiating branch 10 is narrower than the width of the second radiating branch 11 and the length of the first radiating branch 10 is longer than the length of the second radiating branch 11. A third radiating branch 12 having the second end 14 extends from the other end of the first radiating branch 10. The third radiating branch 12 is perpendicular to the first radiating branch 10. In this case, the length of the third radiating branch 12 is shorter than the length of the first radiating branch 10 and the width of the third radiating branch 12 is wider than the width of the first radiating branch 10. In this case, both the second radiating branch 11 and the third radiating branch 12 project toward the same direction.

The feeding conductor 2 connects to the antenna body 1. In this case, the feeding conductor 2 extends from an edge of the second radiating branch 11. In this case, the feeding conductor 2 and the second radiating branch 11 project to opposite directions. The feeding conductor 2 is curved to form U-shape having a first side arm 20, a second side arm 21 opposite to the first side arm 20 and a connecting portion 22. The first and second side arms 20, 21 respectively have an inner edge facing each other and an outer edge opposite to the inner edge. One end of the first and second side arms 20, 21 respectively connects to the second radiating branch 11. The other end of the first and second side arms 20, 21 respectively connects to both ends of the connecting portion 22.

In this case, the outer edge of the first side arm 20 is at the same level with an area where the first radiating branch 10 connects to the second radiating branch 11. A feeding point 3 is arranged at a corner where the first side arm 20 connects to the connecting portion 22. A grounding portion 4 is arranged around the feeding conductor 2. In this case, the grounding portion 4 is arranged to close a corner where the first branch 10 connects to the first side arm 20 of the feeding conductor 2.

Figure 2:
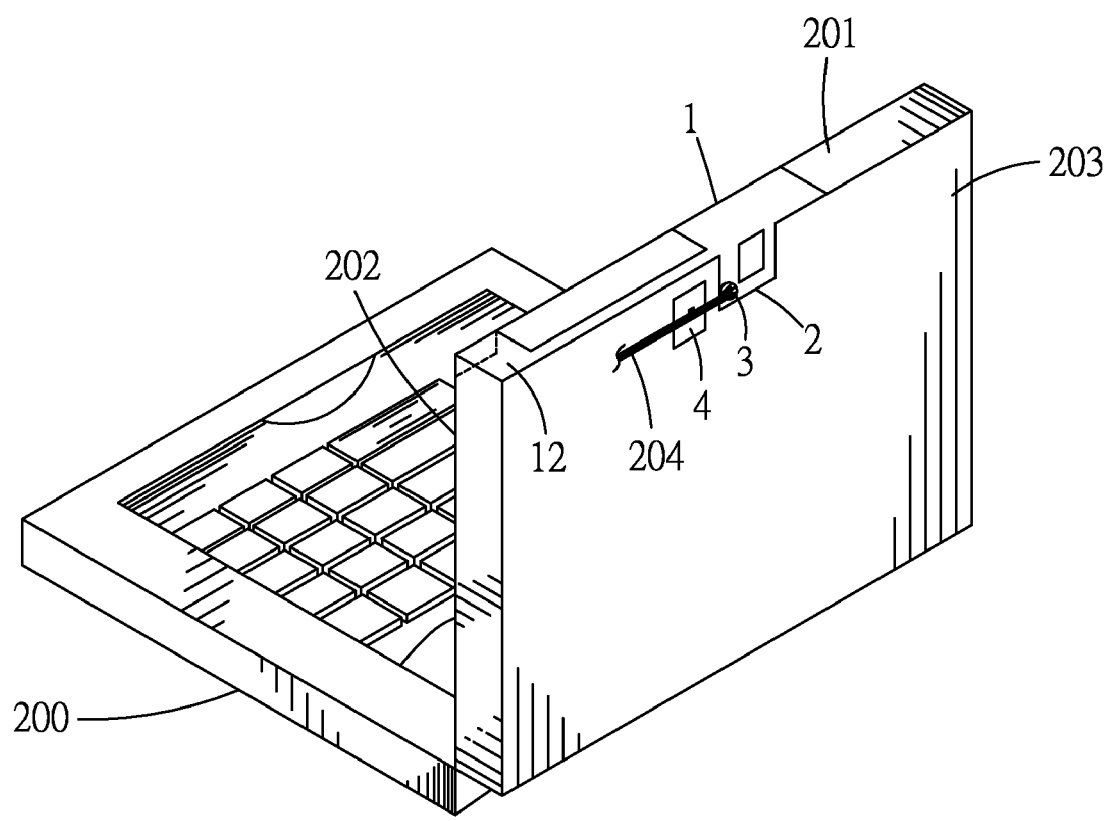
FIG. 2 illustrates the multi-band antenna configured in a notebook.

Referring to FIG. 2, the multi-band antenna 100 is folded for fitting in portable electrical devices. In this case, the multi-band antenna 100 is configured in a laptop 200. The first radiating branch 10, the second radiating branch 11 and the third radiating branch 12 are located on a top 201 of a display of the laptop 200. An end portion of the third radiating branch 12 is located on a front surface 202 of the display of the laptop 200. The feeding conductor 2 and the grounding portion 4 are located on a back surface 203 of the display of the laptop 200. In this case, the grounding portion 1 electronically connects to a ground of the laptop 200. Otherwise, in a further embodiment, the grounding portion 4 could be the ground of the laptop 200. The laptop 200 can operate the multi-band antenna 100 through a cable 204 connecting to the feeding point 3 of the multi-band antenna 100 and the ground portion 4 for sending and receiving wireless signal.

While the multi-band antenna 100 operates at wireless communication, the multi-band antenna 100 resonates a low frequency bandwidth and a high frequency harmonic bandwidth. In this case, a length from the feeding conductor 2 connecting the antenna body 1 to the second end 14 of the antenna body 1 is a quarter of the wavelength of the low frequency bandwidth. A length from the feeding conductor 2 connecting the antenna body 1 to the first end 13 of the antenna body 1 is a quarter of the wavelength of the high frequency harmonic bandwidth.

Therefore, according to the position where the feeding conductor 2 connects to the antenna body 1 and the position where the feeding point 3 is arranged at the corner of the feeding conductor 2, the multi-band antenna 100 has a preferred low frequency bandwidth and a high frequency harmonic bandwidth. Because the outer edge of the feeding conductor 2 is at the same level with the area where the first radiating branch 10 connecting the second radiating branch 11 and the feeding point 3 is arranged at the corner where the first side arm 20 connecting to the connecting portion 22, the low frequency bandwidth of the multi-band antenna 100 includes GSM850 and EGSM bands and the high frequency harmonic bandwidth of the multi-band antenna 100 includes DCP1800, PCS1900, W-CDMA2100 and Wi-Fi bands.

Moreover, the U-shape feeding conductor 2 is designed for balancing horizontal polarization and vertical polarization of the multi-band antenna 100 and enhancing the low frequency bandwidth of the multi-band antenna 100.

Furthermore, the present invention is not limited to the embodiments described above; various additions, alterations and the like may be made within the scope of the present invention by a person skilled in the art. For example, respective embodiments may be appropriately combined.

What is claimed is:

1. A multi-band antenna comprising:
   an antenna body having a first radiating branch having opposite elongated edges, a second radiating branch extending from one end of said first radiating branch, a third radiating branch extending from the other end of said first radiating branch and perpendicular to said first radiating branch, said second and third radiating branches projecting to the same direction;
   a feeding conductor substantially formed U-shape and connecting to said antenna body, said feeding conductor and said second radiating branch projecting to opposite directions, said feeding conductor extending from an area where said first radiating branch connecting said second radiating branch; and
   a feeding point arranged at a corner of said feeding conductor.

2. The multi-band antenna as claimed in claim 1, wherein the length of said first radiating branch is longer than the length of said second radiating branch, the width of said first radiating branch is narrower than the width of said second radiating branch, the length of said third radiating branch is shorter than said length of said first radiating branch, the width of third radiating branch is wider than said width of said first radiating branch.

3. The multi-band antenna as claimed in claim 1, wherein said feeding conductor has a first side arm, a second side arm which is opposite to said first side arm, and a connecting portion, said first and second side arms respectively have an inner edge facing each other and an outer edge opposite to said inner edge, one end of said first and second side arms respectively connects to said second radiating branch and the other end of said first and said second side arms respectively connects to both ends of said connecting portion, said outer edge of said first side arm is at the same level with said area, said feeding point is arranged at said corner where said first side arm connects to said connecting portion.

4. The multi-band antenna as claimed in claim 1, further comprising a grounding portion arranged around said feeding conductor.

5. The multi-band antenna as claimed in claim 4, wherein said antenna body is located on a top of a display of a laptop, a free end portion of said third radiating branch is located on a front surface of said display of said laptop, said feeding conductor and said grounding portion are located on a back surface of said display of said laptop, said laptop operates said multi-band antenna through a cable connecting to said feeding point and said grounding portion.

6. The multi-band antenna as claimed in claim 5, wherein said grounding portion electronically connects to a ground of said laptop.

7. A multi-band antenna operating at a low frequency bandwidth and a high frequency bandwidth two to three frequency higher than said lower frequency bandwidth comprising:
   an elongated antenna body having a first end and a second end, said antenna body having a first radiating branch, a second radiating branch having said first end and extending from one end of said first radiating branch and a third radiating branch having said second end and extending from the other end of said first radiating branch;
   a feeding conductor connecting to said antenna body having a first side arm, a second side arm opposite to said first side arm and a connecting portion, one end of said first and second side arms respectively connecting both ends of said connecting portion, the other end of said first and second side arms respectively connecting said antenna body, a length from said feeding conductor connecting said antenna body to said first end substantially a quarter of the wavelength of said high frequency bandwidth, a length from said feeding conductor connecting said antenna body to said second end substantially a quarter of the wavelength of said low frequency bandwidth; and
   a feeding point arranged at a corner where said first side arm connects to said connecting portion.

8. The multi-band antenna as claimed in claim 7, wherein the length of said first radiating branch is longer than the length of said second radiating branch, the width of said first radiating branch is narrower than the width of said second radiating branch, the length of said third radiating branch is shorter than said length of said first radiating branch, the width of said third radiating branch is wider than said width of said first radiating branch.

9. The multi-band antenna as claimed in claim 7, wherein said first and second side arms respectively have an outer edge opposite to each other, said outer edge of said first side arm is at same level with an area where said first radiating branch connects to said second radiating branch.

10. The multi-band antenna as claimed in claim 9, further comprising a grounding portion arranged around said feeding point.

11. The multi-band antenna as claimed in claim 10, wherein said multi-band antenna is folded to fit for being configured in a portable electronic device, said antenna body and said feeding conductor is substantially located on different planes of said portable electronic device.

12. The multi-band antenna as claimed in claim 11, wherein said grounding portion is a ground of said portable electronic device.

* * * * *